E. RAWSON.
FRUIT CLEANING MACHINE.
APPLICATION FILED NOV. 30, 1914.
1,195,854.
Patented Aug. 22, 1916.
2 SHEETS—SHEET 1.
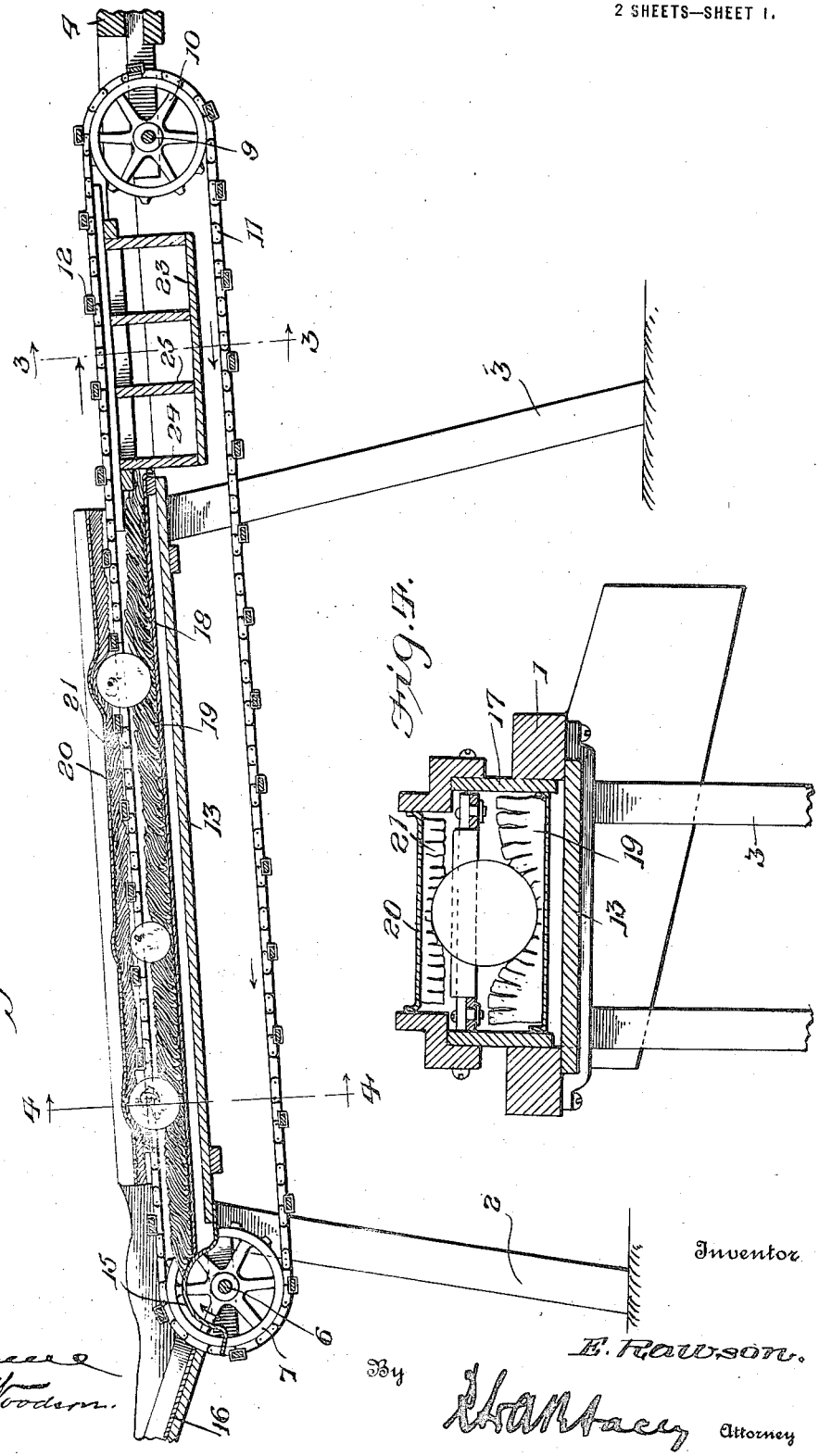

E. RAWSON.
FRUIT CLEANING MACHINE.
APPLICATION FILED NOV. 30, 1914.
1,195,854.
Patented Aug. 22, 1916.
2 SHEETS—SHEET 2.
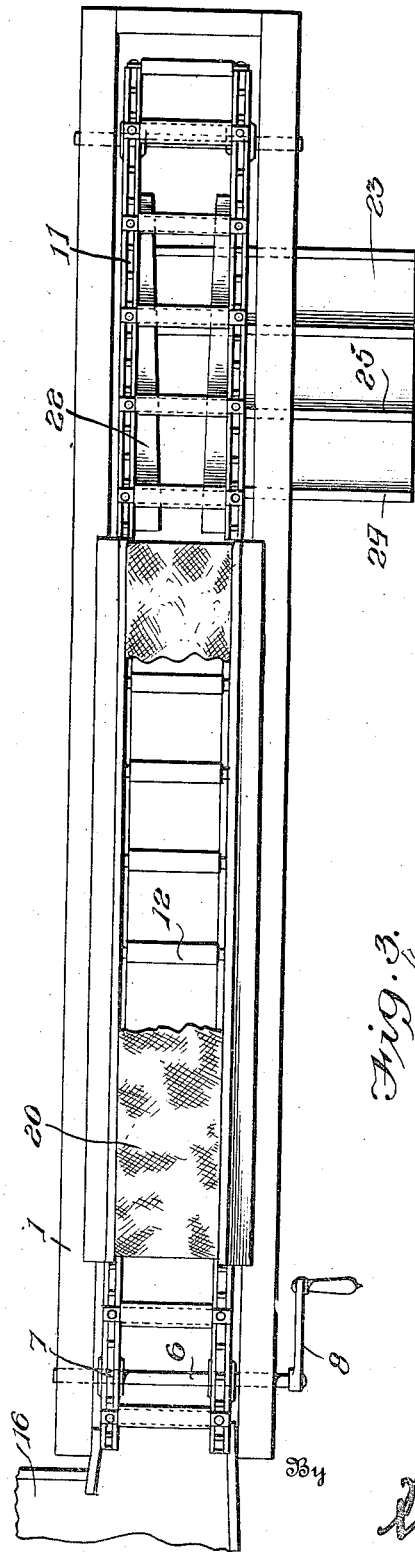
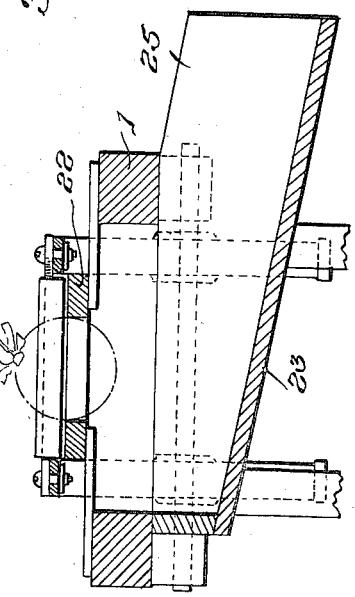
Witnesses
Inventor
E. Rawson.
By
Attorney

UNITED STATES PATENT OFFICE.

EDWARD RAWSON, OF PORTLAND, OREGON.

FRUIT-CLEANING MACHINE.

1,195,854. Specification of Letters Patent. Patented Aug. 22, 1916.

Application filed November 30, 1914. Serial No. 874,802.

*To all whom it may concern:*

Be it known that I, EDWARD RAWSON, a citizen of the United States, residing at St. Johns, Portland, in the county of Multnomah and State of Oregon, have invented certain new and useful Improvements in Fruit-Cleaning Machines, of which the following is a specification.

This invention relates to fruit wiping, polishing and grading machines and has as its object to provide a machine simple in construction and operation and yet capable of effectually and rapidly cleaning, wiping and grading a large quantity of fruit in a comparatively short period of time.

It is one aim of the invention to provide a machine so constructed that in its operation the fruit to be treated will be taken up one piece at a time and moved between wiping and polishing surfaces after which the fruit will be automatically graded according to size.

Another aim of the invention is to so construct the machine that it will be adapted to treat the fruit in a manner to thoroughly wipe and polish all portions of the surfaces thereof without liability of bruising or otherwise injuring the fruit.

Another aim of the invention is to provide in a machine of the class described a novel form of wiping and polishing surface adapted to conform to the shape of the fruit and, therefore, adapted to wipe and polish all portions of the surface of the fruit.

In the accompanying drawings, Figure 1 is a vertical longitudinal sectional view through the machine embodying the present invention. Fig. 2 is a top plan view thereof. Fig. 3 is a vertical transverse sectional view on the line 3—3 of Fig. 1. Fig. 4 is a similar view on the line 4—4 of Fig. 1. Fig. 5 is a detail view of a portion of one of the cleaning surfaces.

In the drawings the machine is illustrated as including in its structure a frame having spaced side members 1 which are supported at the upper ends of front and rear pairs of legs indicated respectively by the numerals 2 and 3. The spaced side members 1 of the frame are connected at the rear end of the machine by a cross piece 4 and forwardly of this cross piece by similar members, indicated by the numeral 5. Journaled in suitable bearings upon the forward ends of the side members 1 is a shaft 6 upon which are fixed sprocket gears 7, these sprocket gears being located immediately inwardly of the said side members 1. A crank handle 8 is fixed upon one end of the shaft 6 and serves as a means whereby the shaft may be rotated in the operation of the machine although it will be understood that power may be transmitted to this shaft in any other desired manner. A shaft 9 is journaled in suitable bearings upon the rear ends of the side members 1 and has fixed upon it sprocket gears 10 and over the sprocket gears 7 and 10 are trained sprocket chains 11 which constitute elements of an endless conveyer completed by transverse conveyer slats 12 extending between the said chains. Secured between the legs 2 and 3 and beneath the side members 1 of the frame is a base board 13 provided at one end with a transverse cleat 14. A curved shield 15 is secured to the forward end of the base board 13 and extends above the shaft 6 in the manner clearly shown in Fig. 1 of the drawings and the upper or convex side of this shield extends above the plane occupied by the base board 13. It will now be apparent that the upper stretch of the endless conveyer travels above the base board 13 and above the shield 15 and in order that the fruit to be treated may be delivered to a position to be taken up by the endless conveyer and moved between the wiping and polishing surfaces to be presently described, a delivery trough or chute 16 is arranged at the forward end of the machine and has its discharge end extending between the sprocket gears 7 and in position to discharge the fruit against the upper surface of the shield 15 in position to be engaged by the transverse slats 12 of the endless conveyer for the purpose above explained.

The members 1 of the frame of the machine support side members 17 between which the upper stretch of the endless conveyer passes in the manner shown in Fig. 4 of the drawings. As before stated the fruit to be treated is carried by the endless conveyer between polishing surfaces and in order that all portions of the surface of the fruit may be effectually wiped and polished these surfaces are of the form shown in Fig. 5 of the drawings. The lower one of the surfaces comprises a sheet 18 of cloth or any other suitable flexible material which is stretched between the cleat 14 and the shield 15 and between the sides 17 and this sheet 18 is provided with a laciniated upper wiping surface 19 preferably formed by attaching to the sheet in a direction extending transversely thereof a number of folded pieces of cloth secured along their folds to the sheet and having their folded portions laciniated or formed with a number of slits dividing the folded portions into strips. In a like manner the upper wiping or cleaning surface comprises a sheet 20 provided with a laciniated under surface 21 and this sheet is supported at its sides between the side members 17 and is, as illustrated in Figs. 1 and 4 of the drawings, allowed to sag so that as the pieces of fruit are drawn by the upper stretch of the endless conveyer between the said cleaning surfaces the laciniated surface 21 will closely conform to the upper sides of the pieces of fruit and thoroughly wipe and polish the same and the fruit resting by its weight upon the laciniated surface 19 of the sheet 18 will have its under surface wiped and polished and the pieces will be caused to roll about so as to present new areas of their surfaces to the cleaning and wiping surfaces 19 and 21.

By reference to Fig. 1 of the drawings it will be observed that the rear end of the baseboard 13 terminates substantially at the upper ends of the rear legs 3 and secured upon the inner sides of the side members of the frame are two slats 22 which have their opposed edges diverging in the direction of the rear end of the machine. As a consequence the space between the slats 22 gradually increases in width in the direction of the rear end of the machine and as the pieces of fruit are moved over the slats 22 or more specifically speaking the said adjacent or opposed edges thereof the pieces will fall through the space between the said edges at one point or another in the length thereof depending upon the respective sizes of the different pieces. In order that the fruit thus graded may be kept separated, a discharge chute is arranged beneath the slats 22 and includes a bottom 23 which is inclined downwardly and laterally and projects beyond one side of the frame of the machine and this chute further includes sides 24 and partitions 25 which latter serve to divide the interior of the chute into a number of separate receiving compartments. It will, of course, be understood that the pieces of fruit discharged into the compartments will roll down the inclined bottom 23 and through the discharge ends of the compartments and into any suitable receptacle or onto a suitable table.

Having thus described the invention, what is claimed as new is:

1. In a fruit cleaning machine, a fixed flexible lower apron having a laciniated upper surface, an upper apron having a laciniated under surface opposing the laciniated surface of the lower apron, and a conveyer having one of its stretches passing between the said surfaces of the aprons and including transverse spaced fruit engaging slats.

2. In a fruit cleaning machine, a fixed flexible lower apron having a laciniated upper surface, a flexible upper apron having a laciniated under surface, and means operating between the said aprons for moving the fruit between the aprons in contact with both of said surfaces.

In testimony whereof I affix my signature in presence of two witnesses.

EDWARD RAWSON. [L. S.]

Witnesses:
  E. B. GAMBEE,
  J. VINTON SCOTT.